US006961654B2

(12) United States Patent
Boggs et al.

(10) Patent No.: US 6,961,654 B2
(45) Date of Patent: *Nov. 1, 2005

(54) CONTROLLED ENGINE SHUTDOWN FOR A HYBRID ELECTRIC VEHICLE

(75) Inventors: David Lee Boggs, Bloomfield Hills, MI (US); Jerry D. Robichaux, Tucson, AZ (US); Mark William Peters, Wolverine Lake, MI (US); Stephen John Kotre, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

This patent is subject to a terminal disclaimer.

(21) Appl. No.: 09/848,492

(22) Filed: May 3, 2001

(65) Prior Publication Data

US 2002/0165660 A1  Nov. 7, 2002

(51) Int. Cl.$^7$ ............................................. F02B 77/00
(52) U.S. Cl. .................. 701/112; 701/102; 701/105; 123/198 DB; 477/187
(58) Field of Search ................... 701/112, 109, 108, 701/102; 123/198 DB, 520, 568.12, 679, 123/497, 478; 180/65.2, 65.8, 165

(56) References Cited

U.S. PATENT DOCUMENTS

| | | | |
|---|---|---|---|
| 4,312,310 A | 1/1982 | Chivilo' et al. | |
| 4,362,133 A * | 12/1982 | Malik | ......................... 477/99 |
| 4,364,343 A * | 12/1982 | Malik | ...................... 123/179.4 |
| 4,366,790 A | 1/1983 | DeBoynton | |
| 4,367,720 A | 1/1983 | Miyoshi et al. | |
| 4,574,752 A | 3/1986 | Reichert, Jr. et al. | |
| 4,653,445 A | 3/1987 | Book et al. | |
| 5,255,733 A * | 10/1993 | King | .................. 123/142.5 R |
| 5,343,970 A | 9/1994 | Severinsky | |
| 5,357,935 A | 10/1994 | Oxley et al. | |
| 5,713,425 A | 2/1998 | Buschhaus et al. | |
| 5,725,064 A | 3/1998 | Ibaraki et al. | |
| 5,785,137 A * | 7/1998 | Reuyl | ........................ 180/65.2 |
| 6,257,194 B1 * | 7/2001 | Kerns et al. | ............. 123/198 D |
| 6,318,334 B1 * | 11/2001 | Reale et al. | .......... 123/198 DB |
| 6,356,042 B1 | 3/2002 | Kahlon et al. | |
| 6,425,365 B1 * | 7/2002 | Peters et al. | .......... 123/198 DB |
| 6,434,453 B1 * | 8/2002 | Kuroda et al. | ............... 701/112 |
| 6,474,291 B2 * | 11/2002 | Collins et al. | ............... 701/112 |
| 6,604,502 B1 * | 8/2003 | Bisaro et al. | .......... 123/198 DB |
| 6,679,228 B1 * | 1/2004 | Confer et al. | ............... 123/516 |
| 6,763,298 B2 * | 7/2004 | Boggs et al. | ............... 701/112 |

FOREIGN PATENT DOCUMENTS

| | | | | |
|---|---|---|---|---|
| EP | 1 193 386 A2 * | 3/2002 | ........... | F02D 41/38 |
| GB | 2346020 A | 7/2000 | | |

(Continued)

*Primary Examiner*—Hieu T. Vo
(74) *Attorney, Agent, or Firm*—Brooks Kushman P.C.; Carlos Hanze

(57) ABSTRACT

A method and system to control engine shutdown in a hybrid electric vehicle (HEV) are provided. Tailpipe emissions are reduced during the many engine shutdowns and subsequent restarts during the course of an HEV drive cycle, and evaporative emissions are reduced during an HEV "soak" (inactive) period. The engine shutdown routine can ramp off fuel injectors, control engine torque (via electronic throttle control), control engine speed, stop spark delivery by disabling the ignition system, stop purge vapor flow by closing a vapor management valve (VMV), stop exhaust gas recirculation (EGR) flow by closing an EGR valve, and flush the intake manifold of residual fuel (vapor and puddles) into the combustion chamber to be combusted. The resulting exhaust gas byproducts are then converted in the catalytic converter.

20 Claims, 3 Drawing Sheets

FOREIGN PATENT DOCUMENTS

| | | |
|---|---|---|
| JP | 11-257119 | 9/1999 |
| WO | WO 01/71181 A2 | 9/2001 |

\* cited by examiner

CONTROLLED ENGINE SHUTDOWN FOR A HYBRID ELECTRIC VEHICLE

BACKGROUND OF THE INVENTION

1. Field of Invention

The present invention relates generally to a hybrid electric vehicle (HEV), and specifically to a method and system to control an HEV engine shutdown.

2. Discussion of the Prior Art

The need to reduce fossil fuel consumption and emissions in automobiles and other vehicles powered by internal combustion engines (ICEs) is well known. Vehicles powered by electric motors attempt to address these needs. Unfortunately, electric vehicles have limited range and limited power capabilities. Further, electric vehicles need substantial time to recharge their batteries. An alternative solution is to combine both an ICE and electric traction motor into one vehicle. Such vehicles are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring (output) gear via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with electric motors is clear. There is great potential for reducing the fuel consumption and emissions of the ICE with no appreciable loss of vehicle performance or driveability. Nevertheless, new ways must be developed to optimize these HEV potential benefits.

One such area of HEV development is implementing a controlled engine shutdown in an HEV. If the engine shuts down in an uncontrolled manner, its starts and stops throughout a given HEV drive cycle can increase tailpipe emissions from inconsistent amounts of residual fuel (vapor and puddles) in the intake manifold from one shutdown to the next. The amount of residual fuel depends on the amount of liquid fuel flow from the injectors, as well as the amount of fuel vapor introduced by the vapor management valve (VMV) and exhaust gas recirculation valve (EGR) prior to the shutdown.

Vapor management valves (VMV) are widely used in evaporative emission control systems to reduce the fuel vapor build up in the fuel system. Fuel vapor in the fuel tank and lines is captured in a vapor storage canister (typically a charcoal material), and then drawn out into the engine's intake manifold via the VMV. The amount of fuel vapor introduced into the intake manifold, and thus into the engine cylinders to be combusted, is proportional to how much the VMV is opened and how much intake manifold vacuum is available.

Exhaust gas recirculation valves (EGR) are widely used in tailpipe emission control systems to re-circulate a portion of the hot exhaust gases back into the intake manifold, thereby diluting the inducted air/fuel mixture and lowering combustion temperatures to reduce the amount of NOx (oxides of nitrogen) that are created. The amount of exhaust gases re-circulated into the intake manifold, and thus into the cylinders, is proportional to how much the EGR valve is opened and how much intake manifold vacuum is available. Though mostly made up of inert byproducts of the previous combustion event, the exhaust gases partially contain some unburned fuel vapor.

During engine shutdown in an HEV drive cycle, the fuel injectors, VMV, and EGR valves may be flowing at different rates depending on when the shutdown occurs, and thus may contribute fuel vapor and puddle amounts to the intake manifold that vary from one engine shutdown to the next. This, in turn, leads to inconsistent amounts of residual fuel left in the intake manifold from one subsequent engine restart to the next. Because of the many engine shutdowns and starts in an HEV, it is important to minimize the amount of tailpipe emissions during these events.

Nevertheless, with an inconsistent amount of residual fuel vapor and puddles, it becomes difficult to deliver the proper amount of fuel through the injectors from one engine start to the next during the course of a drive cycle. Thus, tailpipe emissions may vary from one engine start to the next during a drive cycle.

A controlled engine shutdown routine can also reduce evaporative emissions following a "key-off" engine (and vehicle) shutdown at the end of a drive cycle. One significant contributor to evaporative emissions in conventional vehicles during a "soak" (i.e., the time between drive cycles where the vehicle is inactive and the engine is off) is residual fuel vapor that migrates to the atmosphere from the intake manifold through the vehicle's air induction system. By reducing the residual fuel from the intake manifold, evaporative emissions can be reduced during the vehicle "key-off" soak periods following a drive cycle.

To accomplish this, a "power sustain" function is needed to continue to provide power to HEV controllers, ignition system, and fuel system (pump and injectors) for a period of time after "key-off." This allows the generator to continue to spin the engine (after injectors are shut off) while the spark plugs continue to fire until residual fuel (vapor and liquid) is flushed from the intake manifold into the combustion chamber to be combusted (even if partially), and then moved on into the hot catalytic converter to be converted.

Although controlled engine shutdowns are known in the prior art, no such controlled engine shutdown strategy has been developed for an HEV. U.S. Pat. No. 4,653,445 to Book, et al., discloses a control system for engine protection to different threatening conditions. Examples of such conditions include fire, the presence of combustible gas or fuel, rollover or excessive tilt, low oil pressure, low coolant level, engine overheating, or engine overspeed.

Book's engine shutdown system receives warning signals for fault conditions that initiate engine shutdown. Book also includes a method to divide fault signals into either a fast shutdown response or a delayed shutdown response. This method only applies to convention ICE vehicles.

U.S. Pat. No. 4,574,752 to Reichert, Jr., et al., also discloses an engine shutdown device for a conventional ICE and is particularly suited to stationary engine applications. It describes a controlled timed shutdown to reduce engine wear or system damage if problems arise in an external device powered by the engine. When Reichert's method detects a fault in a peripheral device driven or controlled by the engine, it uses a relay, a fuel shutoff control, an engine throttle control, and a timer to shutdown the engine.

Prior art also reveals other developments to reduce fuel waste, emissions and dieseling during controlled engine shutdown for a conventional ICE. U.S. Pat. No. 4,366,790 to DeBoynton, discloses a by-pass system that stops fuel flow to an engine when combustion is not required. When this normally open by-pass valve is closed during events such as deceleration or engine shutdown, only filtered air at a reduced vacuum is allowed into the engine manifold. This prevents fuel waste. See also generally, U.S. Pat. No. 5,357,935 to Oxley, et al. Other systems have developed to maximize the amount of exhaust gas recirculation when an ICE is switched off to reduce emissions and "dieseling." U.S. Pat. No. 4,367,720 to Miyoshi, et al.

U.S. Pat. No. 4,312,310 to Chivilo, et al., discloses an emissions prevention control system that stops engine fuel intake during idle conditions or deceleration and continues to spin the ICE with an auxiliary power unit such as an electric motor or hydraulic pressure. The motor keeps the engine spinning to allow subsequent fast start-up when normal driving conditions resume.

Although the prior art discloses engine shutdown systems for conventional ICES, they do not meet the engine shutdown needs of an HEV. Thus, a system is needed that controls HEV engine shutdowns to preserve the HEV goal of reduced emissions.

SUMMARY OF THE INVENTION

Accordingly, an object of the present invention is to provide a controlled engine shutdown process for a hybrid electric vehicle (HEV).

It is a further object of the present invention to provide a method and system to control HEV engine shutdowns so as to achieve the HEV goal of reduced emissions (tailpipe and evaporative).

It is a further object of the present invention to provide a method and system to control HEV engine shutdowns that have specific controllers within a vehicle system controller and/or engine controller to: ramp off fuel injectors; control engine torque via a throttle plate; control engine speed; stop spark delivery by disabling an ignition system; stop purge vapor flow by closing a VMV; stop exhaust gas recirculation flow by closing an EGR valve; and flush or clean out an engine intake manifold of residual fuel (vapor and puddles) once all sources of fuel are halted (injectors, VMV, and EGR valve).

It is a further object of the present invention to abort engine shutdown if the engine is commanded to run and the fuel injector ramping has not yet begun.

It is a further object of the present invention to shut off spark by disabling the ignition system when engine speed is less than a calibratable threshold.

It is a further object of the present invention to ramp off fuel injectors in a calibratable manner, such as all injectors off at once, one injector off at a time, or two injectors off at a time.

It is a further object of the present invention to provide a power sustain system for controlled engine shutdown to complete in a "key-off" shutdown.

DETAILED DESCRIPTION OF THE PREFERRED EMBODIMENT

Figure 1:
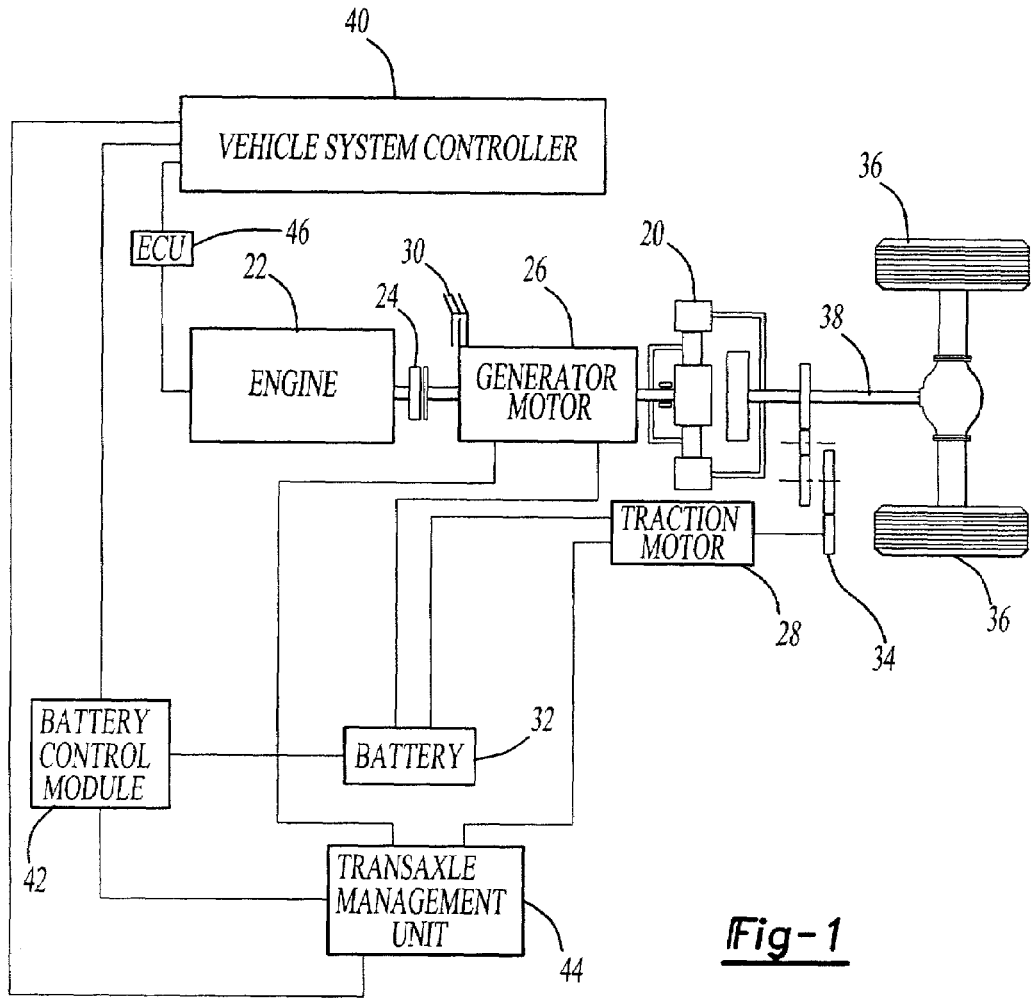
FIG. 1 illustrates a general powersplit hybrid electric vehicle (HEV) configuration.

The present invention relates to electric vehicles and, more particularly, hybrid electric vehicles (HEV). FIG. 1 demonstrates just one possible configuration, specifically a parallel/series hybrid electric vehicle (powersplit) configuration. In a basic powersplit HEV, a planetary gear set 20 mechanically couples a carrier gear to an engine 22 via an one way clutch 24. The planetary gear set 20 also mechanically couples a sun gear to a generator motor 26 and a ring (output) gear to a traction motor 28. The generator motor 26 also mechanically links to a generator brake 30 and is electrically linked to a battery 32. The traction motor 28 is mechanically coupled to the ring gear of the planetary gear set 20 via a second gear set 34 and is electrically linked to the battery 32. The ring gear of the planetary gear set 20 is mechanically coupled to drive wheels 36 via an output shaft 38.

The planetary gear set 20, splits the engine 22 output energy into a series path from the engine 22 to the generator motor 26 and a parallel path from the engine 22 to the drive wheels 36. Engine 22 speed can be controlled by varying the split to the series path while maintaining a mechanical connection through the parallel path. The traction motor 28 augments the engine 22 power to the drive wheels 36 on the parallel path through the second gear Set 34. The traction motor 28 also provides the opportunity to use energy directly from the series path, essentially running off power created by the generator motor 26, thereby reducing losses associated with converting energy into and out of chemical energy in the battery 32.

A vehicle system controller (VSC) 40 controls many components in this configuration. The VSC 40 operates all the vehicle's main components by communicating with each component's controller: the battery control unit (BCU) 42, the transaxle management unit (TMU) 44, and the engine control unit (ECU) 46. This communication is done using a communication network, such as CAN (Controller Area Network) The VSC 40 and the ECU 46 are distinctly separate controllers, but can either be in separate control modules or housed in the same module.

The ECU 46 connects to the engine 22 via a hardwire interface. The BCU 42 connects to the battery 32 via a hardwire interface. The TMU 44 controls the generator motor 26 and traction motor 28 via a hardwire interface.

It is in the VSC 40 and ECU 46 that coordination of a controlled engine 22 shutdown takes place to meet the objects of the present invention. At a predetermined moment when the VSC 40 determines it is best for the vehicle to run without the engine, such as low torque demand or a "key-off" from an operator, the VSC 40 initiates engine 22 shutdown by issuing a command to the ECU 46.

Figure 2:
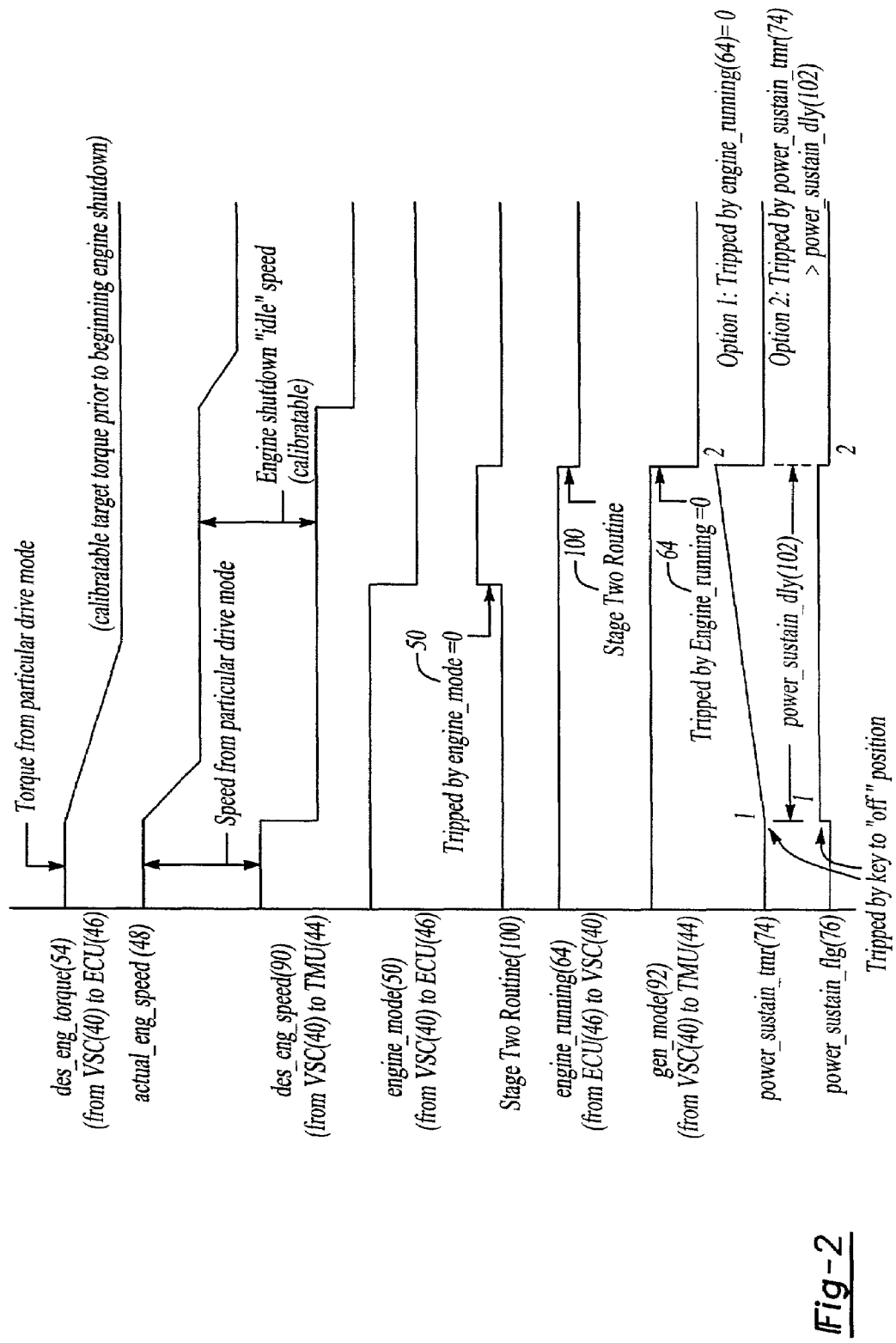
FIG. 2 illustrates stage one of the controlled engine shutdown sequence for a hybrid electric vehicle.
Figure 4:
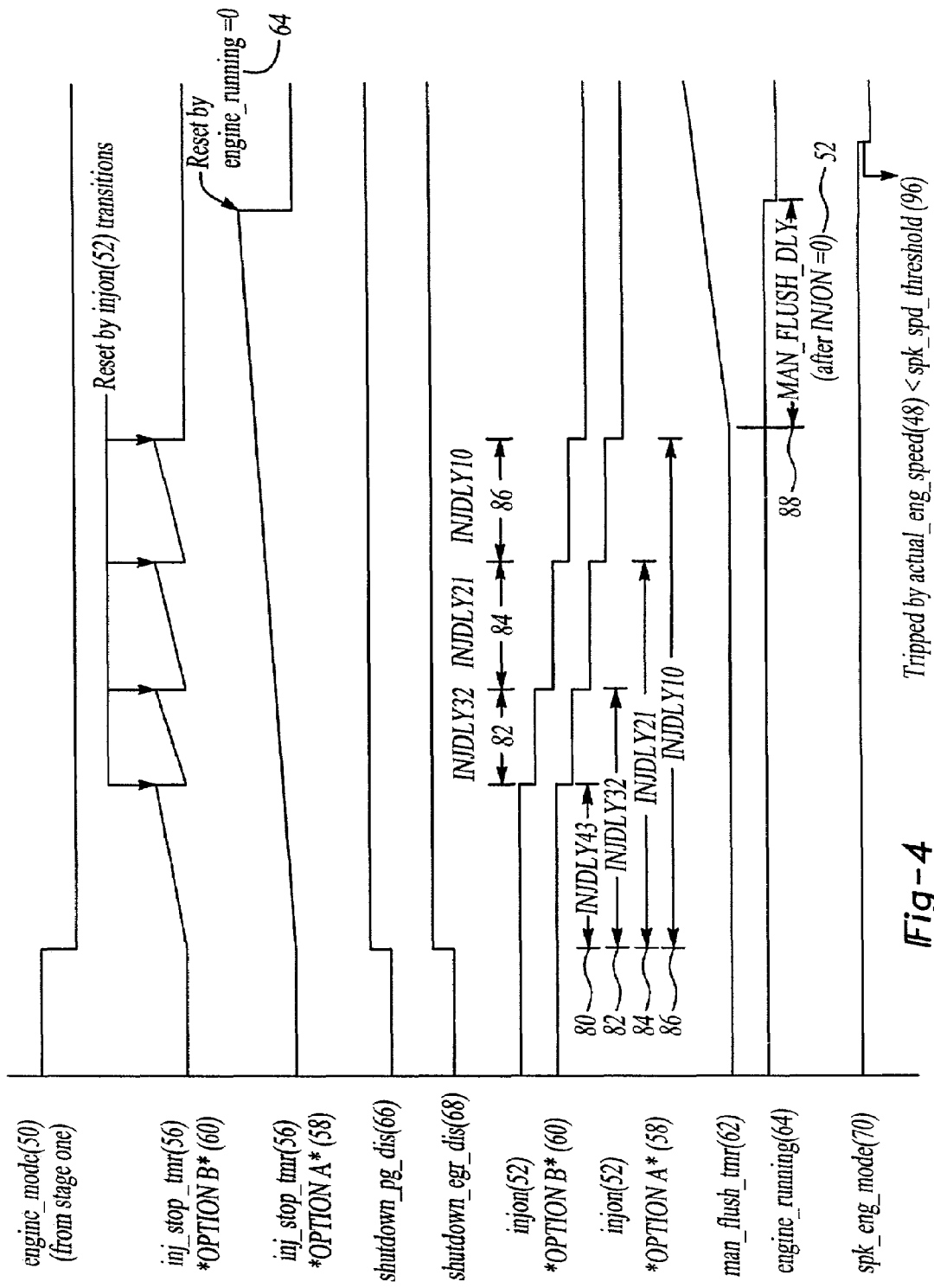
FIG. 4 illustrates stage two of the controlled engine shutdown sequence for a hybrid electric vehicle.

One possible engine 22 shutdown routine, that is the preferred embodiment of the present invention, is illustrated in FIGS. 2 and 4. FIG. 2 specifically illustrates stage one of a HEV engine shutdown routine, and deals with the overall coordination of the engine shutdown by controlling the engine speed and torque (via electronic throttle control) prior to invoking stage two of the engine shutdown sequence, while power is sustained to the controllers, ignition system, and fuel system (pump and injectors) if an optional "power sustain" feature is implemented for "key-off" engine shutdowns. FIG. 4 illustrates stage two, that is a more specific control of the engine components, such as fuel injectors, vapor management valve (VMV), and exhaust gas recirculation (EGR) valves, as well as the ability to "flush" an intake manifold of residual fuel if the optional "power sustain" feature is implemented for "key-off" engine shutdowns. Stage one is illustrated in this preferred embodiment as being handled in the VSC 40, while stage two is handled in the ECU 46. These "stages" do not necessarily need to be located in the controllers used in this illustrative example.

FIG. 2 (stage one) is a timeline going from left to right, as follows:

DES_ENG_TORQUE 54=the desired engine 22 torque command from the VSC 40 to the ECU 46; control of desired engine torque directly controls engine throttle position, if a torque based electronic throttle controller system is used; in this case, with a known engine 22 map, a desired engine 22 brake torque can be broken down into desired engine 22 indicated torque, then to desired engine 22 airflow, and then finally to desired engine 22 throttle position.

ACTUAL_ENG_SPEED 48=the actual engine 22 speed as measured by a crankshaft position sensor (not shown), read by the ECU 46, and sent to the VSC 40.

DES_ENG_SPEED 90=the desired engine 22 speed command from the VSC 40 to the TMU 44; the TMU 44 has the generator motor 26 in "speed" control for most driving and the VSC 40 sets the target speed of the generator motor 26 via this DES_ENG_SPEED 90 command. Generator motor 26 and engine 22 speed are always proportional to each other because they are mechanically coupled in the planetary gear set 20.

ENGINE_MODE 50=the mode command from VSC 40 to ECU 46; 0= engine 22 commanded to be off, 1=engine 22 commanded to be on; this is what starts stage two of the engine shutdown routine as illustrated in FIG. 4.

ENGINE_RUNNING 64=flag indicating whether the engine 22 is running (i.e., making combustion and torque); 0=engine 22 not running (off), 1=engine 22 is running (on). This flag is set to 0 in stage two of the engine shutdown routine as illustrated in FIG. 4 when conditions are met, and then sent from the ECU 46 to the VSC 40.

Stage two routine indicator 100=this routine begins when ENGINE_MODE 50=0. Illustrated with specificity in FIG. 4.

GEN_MODE 92=the mode command from the VSC 40 to the TMU 44; 1=speed control, 0=spin engine to a stop (0 speed).

POWER_SUSTAIN_TMR 74=timer that begins when the key is turned "OFF" and then runs until a calibratable power sustain delay time is met (POWER_SUSTAIN_DLY 102) or when ENGINE_RUNNING 64=0, depending on which option is implemented.

POWER_SUSTAIN_FLG 76=flag set inside the VSC 40 that, when= 1, sustains power to all the controllers, the ignition system, and the fuel system (pump and injectors); flag is set to 1 when the key is turned "OFF", and cleared to 0 when POWER_SUSTAIN_TMR 74 exceeds POWER_SUSTAIN_DLY 102 or when ENGINE_RUNNING 64=0, depending on which option is implemented.

Figure 3:
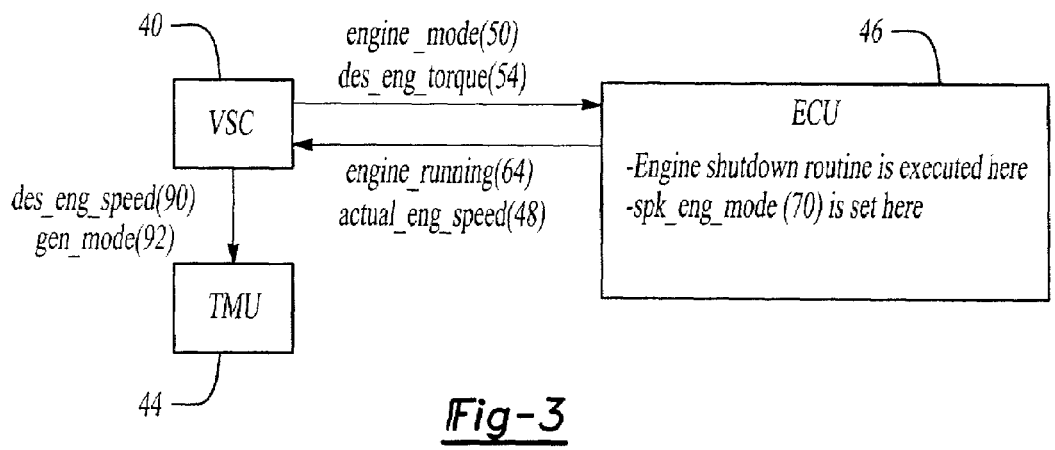
FIG. 3 illustrates a basic schematic of the vehicle system control, engine control unit, and a transaxle management unit.

FIG. 3 shows schematically the interaction of the VSC 40 with the TMU 44 and the ECU 46 as described above.

FIG. 4 (Stage Two) is also a timeline read from left to right, as follows:

ENGINE_MODE 50=the mode command from VSC 40 to ECU 46 that is set in stage one, as illustrated in FIG. 2; 0=engine 22 commanded to be off, 1=engine 22 commanded to be on; this is what starts Stage Two of the engine shutdown routine as illustrated in FIG. 4.

INJ_STOP_TMR 56=(IF OPTION A 58)=timer that begins when the command to do the shutdown is given (ENGINE_MODE 50=0) and then runs until all the injectors are off; each injector is turned off based on a calibratable delay relative to when the shutdown command was given. (IF OPTION B 60)=timer that begins when the command to do the shutdown is given (ENGINE_MODE 50=0) and then gets reset each time one of the injectors is turned off; each injector is turned off based on a calibratable delay relative to when the last injector was shut off.

SHUTDOWN_PG_DIS 66=flag requesting that a purge valve be unconditionally shut off for the shutdown process.

SHUTDOWN_EGR_DIS 68=flag requesting that the exhaust gas recirculation (EGR) valve be unconditionally shut off for the shutdown process.

INJON 52=actual number of fuel injectors commanded ON (maximum is 4 for this 4-cylinder illustrative example).

MAN_FLUSH_TMR 62=timer that begins when all the injectors have been COMMANDED OFF (via INJON 52=0) to allow for the intake manifold to be flushed of residual fuel (vapor and liquid).

ENGINE_RUNNING 64=flag indicating whether the engine 22 is running (i.e., making combustion and torque); 0=engine 22 not running (off), 1=engine 22 is running (on). This flag is set to 0 when a manifold "flushing" process is complete (MAN_FLUSH_TMR 62>MAN_FLUSH_DLY 88) and then sent from the ECU 46 to the VSC 40.

SPK_ENG_MODE 70=spark shutoff command; 0=disable ignition system (i.e., do not allow spark plugs to fire), 1=enable ignition system (i.e., allow spark plugs to fire). This command is set to 1 when ACTUAL_ENG_SPEED 48 falls below a calibratable threshold (SPK_SPD_THRESHOLD 96).

Stages one and two of the engine shutdown routine have the following calibratable parameters (Note: While this example applies only to a four cylinder engine 22, it can easily be adapted to other engines with different cylinder configurations using the same type of parameters.):

INJDLY43 80=time delay from receiving the engine 22 shutdown command (ENGINE_MODE 50=0) to when ONE injector is turned off (either OPTION A 58 or OPTION B 60).

INJDLY32 82=time delay from receiving the engine 22 shutdown command (ENGINE_MODE 50=0) to when TWO injectors are turned off (OPTION A 58), or =time delay from one injector having been turned off (INJON 52=3) to when TWO injectors are turned off (OPTION B 60).

INJDLY21 84=time delay from receiving the engine 22 shutdown command (ENGINE_MODE 50=0) to when THREE injectors are turned off (OPTION A 58), or =time delay from two injectors having been turned off (INJON 52=2) to when THREE injectors are turned off (OPTION B 60).

INJDLY10 86=time delay from receiving the engine 22 shutdown command (ENGINE_MODE=0) to when ALL FOUR injectors are turned off (OPTION A 58), or =time delay from three injectors having been turned off (INJON 52=1) to when ALL FOUR injectors are turned off (OPTION B 60).

MAN_FLUSH_DLY 88=time delay from when the engine 22 has stopped fueling (INJON 52=0) to when the intake manifold has been sufficiently cleaned of residual fuel (vapor and liquid); the engine 22 will continue to be spun by the VSC 40 until this calibratable delay has expired.

SPK_SPD_THRESHOLD 96=engine speed below which the ignition system is disabled (i.e., spark plugs are not fired).

POWER_SUSTAIN_DLY 102=time delay from when POWER_SUSTAIN_TMR 74 begins counting to when POWER_SUSTAIN_FLG is cleared to 0.

This engine 22 shutdown routine accomplishes the HEV objectives described in the prior art review. First, it unconditionally disables purge and EGR (i.e., shuts the valves immediately) via SHUTDOWN_PG_DIS 66 and SHUTDOWN_EGR_DIS 68 to close off these sources of fuel. Second, it shuts off the fuel injectors (the primary source of fuel) in a controlled and calibratable manner (e.g., all injectors off at once, or 2 at a time, or 1 at a time) via INJON 52. Additionally, an abort command is added to the shutdown process if injector ramping has not yet begun. For example, the shutdown would abort if INJON 52 >=4 (or the total number of engine cylinders) and ENGINE_MODE 50 is not=0. Again, shutting off these three sources of fuel helps to create a repeatable and consistent fuel condition in the intake manifold (vapor and liquid) at the end of engine shutdown so that it is easier to control the amount of fuel for optimal air/fuel ratio during the following engine restart.

And finally, if engine shutdown is implemented with a power sustain system (POWER_SUSTAIN_TMR 74, POWER_SUSTAIN_FLG 76, and POWER_SUSTAIN_DLY 102) to the controllers, the ignition system, and the fuel system (pump and injectors), the VSC 40 can continue to spin the engine 22 even though the injectors are off (INJON 52=0) to "flush" residual fuel out of the intake manifold, combust the fuel (even if partially) in the combustion chamber by the continued firing of the spark plugs, and then converting the combustion byproducts in the catalytic converter.

The ENGINE_RUNNING 64 flag is set to 0 once the flushing process is complete and the routine shuts off engine 22 spark completely once ACTUAL_ENG_SPEED 48 has fallen below a calibratable level (SPK_SPD_THRESHOLD 96). Typically, even with the "power sustain" option active, the engine 22 will continue to spin for only a few seconds (2 or 3) after "key-off" so that the driver does not perceive a problem with the engine 22 continuing to run when not expected.

We claim:

1. A system to control an engine shutdown for a hybrid electric vehicle (HEV) wherein vehicle tailpipe and evaporative emissions are reduced, the system comprising:
   at least one controller configured to control an engine shutdown routine, including controlling engine torque and controlling engine speed.

2. The system of claim 1, wherein the engine shutdown routine further includes:
   ramping off fuel injectors;
   stopping firing of spark plugs by disabling ignition system;
   stopping purge flow from a vapor management valve (VMV);
   stopping exhaust gas recirculation (EGR) flow from an EGR valve; and
   flushing an engine intake manifold of residual fuel once all sources of fuel (injectors, VMV, and EGR valve) are halted.

3. The system of claim 2 further comprising an abort engine shutdown control if an engine is required to run again and fuel injector ramping has not yet begun.

4. The system of claim 2 further comprising a power sustain control after the engine and vehicle are "keyed off" to allow a generator to continue to spin the engine (after injectors are shut off) whereby residual fuel is flushed from the engine intake manifold into engine cylinders to be combusted, and then on to a hot catalytic converter to have the resulting exhaust gas byproducts converted.

5. The system of claim 2 wherein the fuel injectors are ramped off in a calibratable manner.

6. The system of claim 5 wherein a fuel injector calibration turns all injectors off at once.

7. The system of claim 5 wherein a fuel injector calibration turns one injector off at a time.

8. The system of claim 5 wherein a fuel injector calibration turns two injectors off at a time.

9. The system of claim 2 wherein a spark control shuts off spark when engine speed is less than some calibratable level.

10. The system of claim 1, wherein the controller is configured to control engine shutdown in two stages, the first stage including controlling engine torque and controlling engine speed.

11. A method to control an engine shutdown for a hybrid electric vehicle (HEV) comprising the steps of:
    controlling engine torque; and
    controlling engine speed.

12. The method of claim 11 further comprising the steps of:
    ramping off fuel injectors;
    stopping the firing of spark plugs by disabling an ignition system;
    stopping purge flow from a vapor management valve (VMV);
    stopping exhaust gas recirculation (EGR) flow from an EGR valve; and
    flushing an engine intake manifold of residual fuel after halting all sources of fuel in the fuel injectors, VMV, and EGR valve.

13. The method of claim 12 further comprising the step of aborting the HEV engine shutdown if engine demand changes to require the engine to run again and fuel injector ramping has not yet begun.

14. The method of claim 12 further comprising the step of sustaining power after "keying-off" the engine and vehicle to allow a generator to continue spinning the engine (after injectors are shut off) whereby residual fuel is flushed from the engine intake manifold into engine cylinders to be combusted, and then on to a hot catalytic converter to have the resulting exhaust gas byproducts converted.

15. The method of claim 12 further comprising the step of shutting off spark when engine speed if less than a calibratable level.

16. The method of claim 12 wherein ramping off fuel injectors is done in a calibratable manner.

17. The method of claim 16 wherein ramping off fuel injectors turns one injector off at a time.

18. The method of claim 16 wherein ramping off fuel injectors turns two injectors off at a time.

19. The method of claim 12 wherein ramping off fuel injectors turns all injectors off at once.

20. The method of claim 11, wherein the engine shutdown is controlled in two stages, the first stage including controlling engine torque and controlling engine speed.

* * * * *